US007664405B2

(12) United States Patent
Paulson

(10) Patent No.: US 7,664,405 B2
(45) Date of Patent: Feb. 16, 2010

(54) PLUGGABLE OPTICAL DIPLEXER/TRIPLEXER MODULE

(75) Inventor: Mark T. Paulson, Excelsior, MN (US)

(73) Assignee: Calix Networks, Inc., Petaluma, CA (US)

( * ) Notice: Subject to any disclaimer, the term of this patent is extended or adjusted under 35 U.S.C. 154(b) by 596 days.

(21) Appl. No.: 11/122,653

(22) Filed: May 5, 2005

(65) Prior Publication Data

US 2006/0067705 A1   Mar. 30, 2006

Related U.S. Application Data

(60) Provisional application No. 60/613,772, filed on Sep. 28, 2004.

(51) Int. Cl.
*H04B 10/00* (2006.01)
*H04J 14/02* (2006.01)

(52) U.S. Cl. ............................ 398/164; 398/82; 398/66

(58) Field of Classification Search ................. 398/164, 398/166, 167.5, 171, 66, 67, 68, 70, 71, 72, 398/165, 168, 79, 82, 43
See application file for complete search history.

(56) References Cited

U.S. PATENT DOCUMENTS

| 5,303,229 | A | 4/1994 | Withers et al. | |
|---|---|---|---|---|
| 6,362,908 | B1* | 3/2002 | Kimbrough et al. | 398/164 |
| 6,928,301 | B2* | 8/2005 | Souissi et al. | 455/557 |
| 7,127,133 | B2* | 10/2006 | Manderscheid | 385/14 |
| 2003/0007220 | A1* | 1/2003 | Whittlesey et al. | 359/167 |
| 2003/0020986 | A1 | 1/2003 | Pang et al. | |
| 2004/0081468 | A1* | 4/2004 | Ichihara et al. | 398/164 |
| 2004/0197104 | A1* | 10/2004 | Doo et al. | 398/164 |
| 2005/0009408 | A1* | 1/2005 | Karir | 439/676 |
| 2005/0037655 | A1 | 2/2005 | Henry et al. | |
| 2005/0041933 | A1 | 2/2005 | Meadowcroft et al. | |
| 2005/0249504 | A1* | 11/2005 | O'Donnell et al. | 398/140 |

OTHER PUBLICATIONS

Compagnie Deutsch—Components for Fiber Optics: "Triplexers-WDM FSAN-TPM series", Sep. 2001.*
Notification of Transmittal of the International Preliminary Report on Patentability for corresponding patent application No. PCT/US2005/034556, mailed Jan. 19, 2007, 13 pages.
Applicant's Reply to the Written Opinion dated Feb. 28, 2006 in corresponding patent application No. PCT/US2005/034556, filed on Jul. 25, 2006 (28 pages).
Triplexers—WDM: FSAN-TPN series, Compagnie Deutsch—Components for Fiber Optics, XP-002367961, Sep. 2001, (6 pages).

(Continued)

*Primary Examiner*—M. R. Sedighian
(74) *Attorney, Agent, or Firm*—Shumaker & Sieffert, P.A.

(57) ABSTRACT

The invention is directed to a pluggable module and mounting socket for use in an optical network terminal (ONT). In particular, the mounting socket accepts a pluggable module comprising either a dual-section triplexer card or a single-section diplexer card, thereby allowing a vendor to selectively change the type of PON transport by simply changing the diplexer/triplexer pluggable module to support either diplexer or triplexer applications. The ability to configure the ONT by swapping out the pluggable diplexer/triplexer module eliminates the need for a manufacturer to maintain two different versions of the ONT, i.e., with or without video.

48 Claims, 9 Drawing Sheets

OTHER PUBLICATIONS

The Notification of Transmittal of the International Search Report and the Written Opinion of the International Searching Authority for patent application No. PCT/US2005/034556, mailed Feb. 28, 2006, (12 pages).

"Small Form-factor Pluggable (SFP) Transceiver MultiSource Agreement (MSA)", Cooperation Agreement for Small Form-factor Pluggable Transceivers, (38 pages), Sep. 14, 2000.

"V23818-K305-B57 Small Form Factor Pluggable SFP Multimode 850 nm 1.0625 GBd Fibre Channel 1.25 Gigabit Ethernet Transceiver with LC™ Connector", (9 pages), Jan. 2002.

"SFP-Small Form-factor Pluggable Multimode 850 nm 1.0625 Gbit/s Fibre Channel 1.25 Gigabit Ethernet Transceiver with LC™ Connector", V23818-K305-B57, Infineon Technologies AG, (19 pgs), Apr. 25, 2003.

* cited by examiner

PLUGGABLE OPTICAL DIPLEXER/TRIPLEXER MODULE

This application claims the benefit of U.S. provisional application no. 60/613,772, filed Sep. 28, 2004, the entire content of which is incorporated herein by reference.

TECHNICAL FIELD

The invention relates to passive optical networks (PONs) that deliver voice, video, and data to subscriber premises and, more particularly, modules for receiving voice, video, and data.

BACKGROUND

Integrated networks transmit voice, video, and data to subscribers via network signal carriers in the form of coaxial cable or optical fiber. An example of an integrated network is a passive optical network (PON), which can deliver voice, video, and data, often referred to as "triple play services." A PON delivers voice, video and data among multiple network nodes, often referred to as optical network terminations (ONTs), using a common optical fiber link. Passive optical splitters and combiners enable multiple ONTs to share the optical fiber link. Each ONT terminates the optical fiber link for a residential or business subscriber, and is sometimes referred to as a subscriber premises node. An ONT is connected to one or more subscriber devices, such as televisions, set-top boxes, telephones, computers, or network appliances, which ultimately receive the voice, video and other data delivered via the PON.

Generally, a PON includes a PON interface, sometimes referred to as an optical line terminator (OLT), having multiple, independent PON interface modules that serve multiple optical fiber links. A PON interface module provides an interface for transmission and reception of data packets over a particular optical fiber link that serves a group of ONTs. A PON is inherently a downstream-multicast medium. Each packet transmitted on an optical fiber link can be received by every ONT served by that link. ONTs identify selected packets or frames on the fiber link based on addressing information included within the packets or frames.

In a fiber to the premises (FTTP) application, each ONT terminates the optical fiber link for a residential or business subscriber, and is sometimes referred to as a subscriber premises node. The OLT is typically located in a telecommunication company central office (CO), while the ONT is typically mounted on or within a residence or business. For an exemplary FTTP application, the triple play services are transmitted over the PON on three wavelengths of light, e.g., 1550 nanometer (nm) for downstream analog video, 1490 nm for downstream digital voice and data, and 1310 nm for upstream digital voice and data.

On the OLT side of the fiber, a 1490 nm transmitter and a 1310 nm receiver are contained in an optical diplexer. As an example, the optical diplexer may contain a 1490 nm laser, a 1310 nm positive-intrinsic-negative (PIN) photodiode along with a Trans-Impedance Amplifier (TIA), and Coarse Wavelength Division Multiplexer (CWDM) optics to separate the 1490 and 1310 nm wavelengths of light. The 1550 nm light carrying analog video from a headend cable television (CATV) laser is coupled to the PON via external CWDM optics.

At the ONT, a single optical component called a triplexer separates the three wavelengths received via the optical fiber into three ports. A laser driver controls a 1310 nm laser to transmit upstream data from the ONT onto the optical fiber. A PIN photodiode plus a TIA operate to receive the 1490 nm downstream data from the optical fiber, and an analog photodiode receives the 1550 nm video signal from the optical fiber. CWDM optics also are provided in the ONT to separate the light for the three different ports, i.e., digital transmit, digital receive and analog video.

A triplexer module generally includes the triplexer, the laser driver to interface to the laser, the limit amplifier to amplify the output of the low level digital receiver, and the video circuit. More particularly, the video circuit in the triplexer module includes the analog photodiode, an analog photodiode matching network, an automatic gain controller, a radio frequency (RF) amplifier and an RF output connector to a television. The limit amplifier in the receiver transmits digital serial receive data to the ONT media access control (MAC) circuitry, which directs data to provide data and voice applications to a subscriber, e.g., for Ethernet and telephone services. The laser driver receives digital serial transmit data from the ONT MAC for transmission of data via the optical fiber.

Most FTTP installations require voice and data, but only approximately half of these installations require analog video for CATV service. Consequently, a less expensive diplexer can be used on the ONT side, instead of a triplexer module, if no analog video is required. A diplexer is generally constructed in a manner similar to a triplexer, except that it does not include an analog photodiode and associated optics for analog video applications. The diplexer also eliminates the analog circuitry associated with the CATV output of the FTTP system. Triplexer and diplexer modules typically are fixed modules that are soldered to an ONT circuit card, and are not ordinarily footprint-compatible. Consequently, vendors often carry in inventory two different versions of the ONT circuit card, one with a triplexer for analog video and the other with a diplexer if analog video is not required.

SUMMARY

In general, the invention is directed to a pluggable module and mounting socket for use in an optical network terminal (ONT). The mounting socket accepts a pluggable module comprising either a dual-section triplexer card or a single-section diplexer card, thereby allowing a vendor to selectively change the type of PON transport by simply changing the pluggable module to support either a diplexer or triplexer application. The ability to configure the ONT by swapping out the pluggable diplexer or triplexer module eliminates the need for a manufacturer to maintain two different versions of an ONT circuit card, i.e., one version with analog video and another version without analog video.

A pluggable module may be constructed in a manner similar to a small form-factor pluggable (SFP) module. For ONTs that require video, the pluggable module may comprise a composite circuit card comprising a first card section including a triplexer and digital circuitry coupled to the triplexer and a second card section including analog video circuitry coupled to the triplexer. In this case, the mounting socket may include first and second chambers that receive the first card section and the second card section, respectively. Each of the digital and analog sections of the dual section circuit card may include connectors that protrude from one end of the SFP module for engagement with reciprocal connectors within the mounting socket for connection to ONT processing circuitry.

In some embodiments, the mounting socket may include a dividing wall that separates the two mounting chambers. In this case, an optional gap defined between the two card sections may be designed to interlock with a slot formed in the dividing wall of the mounting socket to permit full insertion of the two adjacent card sections into the two chambers of the mounting socket. The gap extends along substantially the entire length of the triplexer card, but stops short of the end so that the card sections remain structurally coupled to one another. Alternatively, rather than having a slot, the dividing wall that separates the two mounting chambers may be easily removed to receive the dual section circuit card. Accordingly, the dual section circuit card may be implemented without a gap and may be inserted in a dual SFP cage with a removable dividing wall, or a dual SEP cage without a dividing wall, in this case.

In addition, a radio frequency (RF) connector slot may be formed in the mounting socket to accommodate an RF connector that connects to a coaxial cable protruding laterally outward from the analog video card section. In some cases, the analog video signal may be output via an analog connector that interfaces with the reciprocal connector within the mounting socket for connection to the ONT processing circuitry rather than via a coaxial cable. In such cases, the mounting socket need not include an RF connector slot.

When no video services are required, the mounting socket may receive a pluggable module comprising a circuit card including a diplexer and digital circuitry coupled to the diplexer in one of the module compartments. Thus, the mounting socket flexibly accepts either a dual-section triplexer card or a single-section diplexer card. In some embodiments, the diplexer card may be formed by populating a dual-section card with only those components necessary for the diplexer application. Consequently, a generic circuit card may be used, but populated with a lesser or greater number of components, depending on the application.

In one embodiment, the invention provides a triplexer module for use in an optical network terminal (ONT) for use in a passive optical network (PON), the triplexer module comprising a circuit card having a first card section and a second card section, a triplexer mounted on the circuit card, digital circuitry, coupled to the triplexer and mounted on the first card section, that processes digital information, analog video circuitry, coupled to the triplexer and mounted on the second card section, that processes analog video information, and a pluggable module case containing at least a portion of the circuit card, triplexer, digital circuitry and analog video circuitry.

In another embodiment, the invention provides a triplexer system for use in an optical network terminal (ONT) for use in a passive optical network (PON), the triplexer system comprising a triplexer module and a mounting socket. The triplexer module includes a circuit card having a first card section and a second card section, a triplexer mounted on the circuit card, digital circuitry, coupled to the triplexer and mounted on the first card section, that processes digital information, analog video circuitry, coupled to the triplexer and mounted on the second card section, that processes analog video information, and a pluggable module case containing at least a portion of the circuit card, triplexer, digital circuitry and analog video circuitry. The mounting socket is mounted on an ONT circuit board and receives at least a portion of the triplexer module, the mounting socket including a first chamber to receive at least a portion of the first card section, and a second chamber to receive at least a portion of the second card section.

In an additional embodiment, the invention provides a triplexer system for use in an optical network terminal (ONT) for use in a passive optical network (PON), the triplexer system comprising a mounting socket, mounted on an ONT circuit board, that receives at least a portion of a triplexer module, the mounting socket including a first chamber to receive at least a portion of a first card section of a triplexer module, and a second chamber to receive at least a portion of a second card section of the triplexer module.

The invention may offer one or more advantages. For example, the dual chamber mounting socket can selectively receive either a dual section triplexer card or a diplexer card depending on the application. Accordingly, it is not necessary to maintain ONT circuit cards with either a triplexer or a diplexer. Instead, a generic ONT circuit card can be manufactured to receive either a single-section diplexer module or a dual section triplexer module via a single type of mounting socket. In this manner, the dual chamber mounting socket and module design may reduce the cost of manufacturing the ONT circuit card.

For example, the ONT circuit card can be tested with a triplexer module, and then be shipped in the ONT without a diplexer or triplexer module. At a later time, an installation technician or another manufacturer may install an appropriate diplexer or triplexer module. Consequently, a vendor may be able to configure the type of PON transport by simply installing the pluggable diplexer/triplexer module to support either diplexer or triplexer applications on a selective basis. As an example, a vendor or installation technician may upgrade the optics from 1.2 Gbit downstream/622 Mbit upstream to 2.4 Gbit downstream/1.2 Gbit upstream by simply removing the subscriber's current pluggable diplexer/triplexer module and installing a pluggable diplexer/triplexer module with the required optics. Also, optics or electronics can be changed within the pluggable diplexer/triplexer module for cost reduction without affecting the ONT circuitry.

For example, a service provider may reconfigure an ONT by changing the diplexer/triplexer module in the field without affecting the ONT. For example, a service provider may update an ONT by swapping a diplexer module for a triplexer module within the mounting socket. This feature may be useful if a customer originally did not want video, and later wants to add video. Video could also be eliminated by swapping a diplexer module for a triplexer module in order to reduce cost, although many service providers may leave the originally installed triplexer module in place.

The details of one or more embodiments of the invention are set forth in the accompanying drawings and the description below. Other features, objects, and advantages of the invention will be apparent from the description and drawings, and from the claims.

DESCRIPTION

Figure 1:
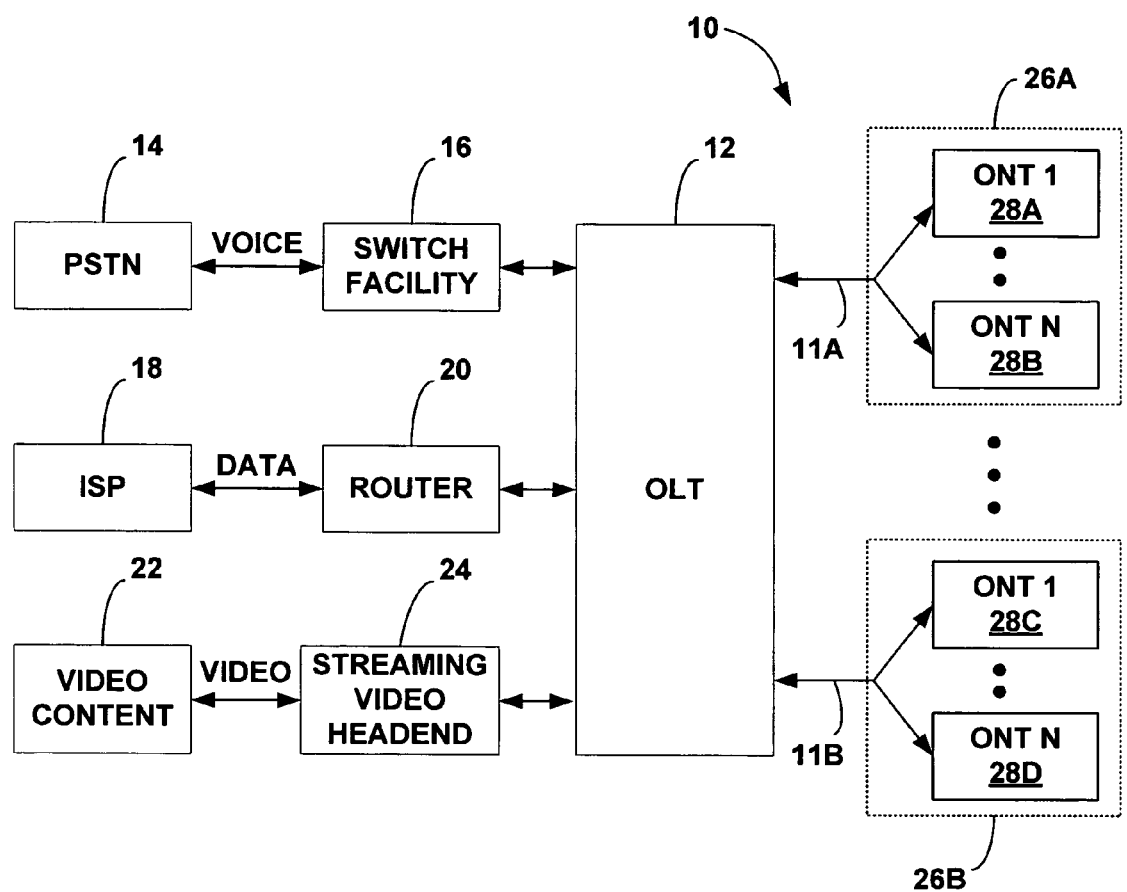
FIG. 1 is a block diagram illustrating an exemplary passive optical network (PON).

FIG. 1 is a block diagram illustrating a passive optical network (PON) 10. As shown in FIG. 1, PON 10 can be arranged to deliver voice, data and video content (generally "information") to a number of network nodes via optical fiber links. Exemplary components for implementing a PON are commercially available from Optical Solutions, Inc., of Minneapolis, Minn., and designated by the tradename Fiberpath™, including the Fiberdrive™ headend bay interface, i.e., OLT, and the Fiberpoint™ subscriber premise node, i.e., ONT.

An OLT 12 may receive voice information, for example, from the public switched telephone network (PSTN) 14 via a switch facility 16. In addition, OLT 12 may be coupled to one or more Internet service providers (ISP's) 18 via the Internet and a router 20. Generally, OLT 12 includes a diplexer comprising a 1490 nanometer (nm) transmitter and a 1310 nm receiver for transmitting and receiving digital voice and data information. As further shown in FIG. 1, OLT 12 may also receive 1550 nm light carrying analog video content 22 from video content suppliers via a streaming video headend 24.

OLT 12 receives the information, and distributes it along optical fiber links 11A and 11B (collectively "fiber links 11") to groups 26A and 26B (collectively "groups 26") of ONTs 28A, 28B, 28C and 28D (collectively "nodes 28"). Each of groups 26 is coupled to a respective one of optical fiber links 11. OLT 12 may be coupled to any number of fiber links 11. Accordingly, FIG. 1 shows only two fiber links 11A, 11B for purposes of illustration, and is not intended to be limiting.

ONTs 28 include hardware for receiving information from PON 10 via optical fiber links 11, and delivering the information to a connected subscriber device, or one or more connected devices. For example, an ONT 28 may transmit voice information over PSTN 14 via OLT 12 and switch facility 16 in the course of a telephone conversation. In addition, ONT 28 may transmit data to a variety of nodes on the Internet via ISP 18, router 20 and OLT 12. Multiple ONTs 28 typically transmit upstream over a common optical fiber link 11 using time division multiplexing techniques, and rely on a downstream grant packet for assignment of upstream time slots to individual ONTs.

ONT 28 serves as a PON access point for one or more computers, network appliances, televisions, set-top boxes, wireless devices, or the like, for video and data services. In addition, each ONT 28 may be connected to subscriber telephones for delivery of telephone services. Hence, ONT 28 may provide video to support television applications, data to support Internet access, and voice to support telephone services. OLT 12 may be located near or far from a group 26 of ONTs 28. In some existing networks, however, OLT 12 may reside in a central office situated within approximately ten miles from each ONT 28.

An ONT 28 may be located at any of a variety of locations, including residential or business sites. In addition, a single ONT 28 may operate on a shared basis to deliver information to two or more closely located residences or businesses via copper or additional optical fiber connections, either directly or via a network hub, router or switch. A group 26 of ONTs 28 may refer to nodes served by OLT 12 via a common optical fiber link 11. Each group 26 in FIG. 1 contains two ONTs 28 for purposes of illustration. However, a group 26 may include a single ONT 28, or numerous ONTs.

An ONT 28 that receives analog video information and digital voice and data includes a triplexer (not shown in FIG. 1) to separate the received wavelengths and transmitted wavelength communicated via links 11. An ONT 28 that receives only digital voice and data may include a diplexer to separate the received wavelength and transmitted wavelength. As will be described in detail, ONTs 28 comprise a pluggable module and a mounting socket for use in PON 10. In particular, the mounting socket accepts a pluggable module comprising either a dual-section triplexer module, a single-section diplexer module, or a dual-section module having only diplexer electronics.

With a mounting socket that accepts a pluggable module, as described herein, a vendor may selectively change the type of PON transport by simply changing the diplexer/triplexer pluggable module to support the services required by the subscriber. The ability to selectively configure ONTs 28 by swapping out the pluggable diplexer module or triplexer module eliminates the need for a manufacturer to maintain an inventory of two different versions of ONT boards, i.e., with and without analog video capabilities. In addition, the ability to reconfigure ONTs 28 may permit a vendor to update an ONT in the field by simply swapping out a diplexer module in exchange for a triplexer module, e.g., for a customer who originally did not want video, and later wants to add video.

Figure 2:
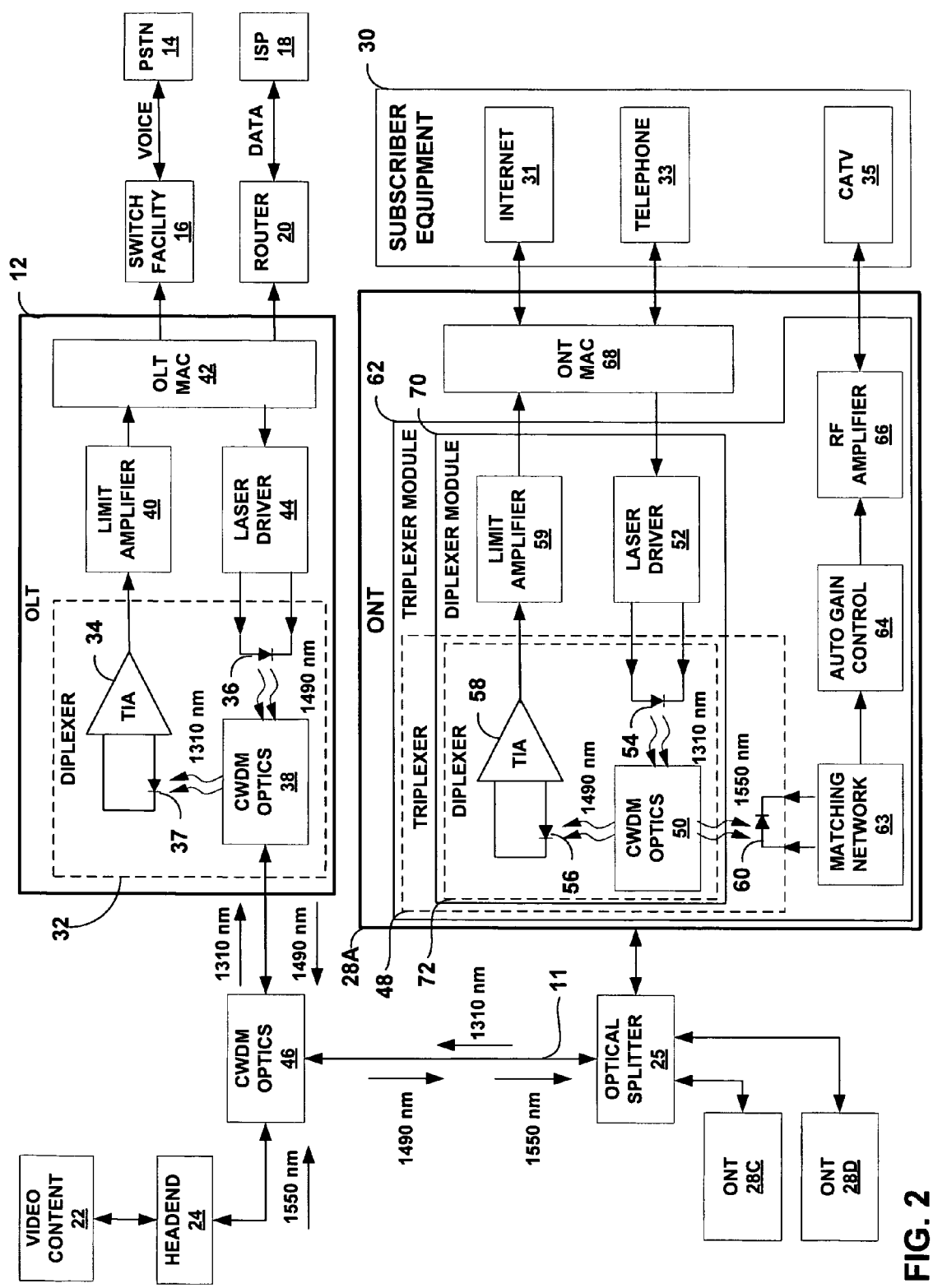
FIG. 2 is a block diagram illustrating the PON of FIG. 1 with a pluggable triplexer module.

FIG. 2 is a block diagram illustrating an exemplary ONT 28A of PON 10 with a pluggable triplexer module 48. ONT 28A provides an interface between an optical fiber link 11 on PON 10 and subscriber equipment 30 in a fiber-to-the-home (FTTH) network. Generally, the three services, voice, video and data, are transmitted over PON 10 on three wavelengths of light, e.g., 1550 nm for downstream analog video, 1490 nm for downstream digital voice and data, and 1310 nm for upstream digital voice and data.

Passive optical splitter 25 enables, for example, ONT 28A, ONT 28C, and ONT 28D to share optical fiber link 11. In particular, ONT 28A receives information in the form of voice, video and data from PON 10 over optical fiber link 11 from OLT 12. ONT 28A processes the information to deliver Internet service 31, telephone service 33 and cable television (CATV) service 35 services to subscriber equipment 30. Subscriber equipment 30 may include telephones, computers, televisions, set-top boxes, network applications, and the like. ONT 28A sends video signals to support CATV service 35 via a coaxial cable, data to support Internet service 31 via network cables such as Ethernet cable, and voice signals to support telephone services 33 over twisted pair wire.

As further shown in FIG. 2, OLT 12 includes a 1490 nm transmitter and a 1310 nm receiver, such as a burst-mode receiver, in an optical diplexer 32. Accordingly, the 1310 nm burst-mode receiver may comprise a burst-mode trans-impedance amplifier (TIA) 34 and 1310 nm positive-intrinsic-negative (PIN) photodiode 37. The 1490 nm transmitter may comprise a 1490 nm laser diode 36 coupled to CWDM optics 38. Limit amplifier 40 may comprise a burst-mode limit amplifier and amplifies the output of the low level digital receiver formed by PIN photodiode 37 and burst-mode TIA 34. Burst-mode limit amplifier 40 may then transmit the received digital data to OLT media access control (MAC) circuitry 42. Laser driver 44 is coupled to laser 38 to transmit digital voice and data information downstream from OLT 12 to ONT 28A via optical fiber links 11.

OLT MAC circuitry 42 directs data to provide data and voice applications via PON 10. For example, OLT MAC circuitry 42 may transmit voice information over PSTN 14 and switch facility 16 in the course of a telephone conversation or transmit data to a variety of nodes on the Internet via ISP 18 and router 20.

Laser driver 44 receives digital serial transmit data from OLT MAC circuitry 42 and laser 38 transmits the information over 1490 nm wavelengths of light. In addition, diplexer 32 includes CWDM optics 38 to separate the 1490 nm wavelengths of light to be transmitted downstream to ONT 28A and the 1310 nm wavelengths of light received from ONT 28A. Furthermore, the 1550 nm light carrying analog video from video content source 22, via headend 24, is coupled to PON 10 via external CWDM optics 46. CWDM optics 46 separates the downstream 1490 and 1550 nm wavelengths of light and the upstream 1310 nm wavelengths of light.

ONT 28A may include a triplexer 48, which separates the three wavelengths of light received and transmitted via optical fiber links 11 into three ports. CWDM optics 50 separates the light for the three different ports, i.e. digital transmit, digital receive, and analog video. Laser driver 52 may comprise a burst-mode laser driver and controls a 1310 nm laser 54 to transmit upstream data from ONT 28A onto optical fiber 11. A PIN photodiode 56 coupled to a burst-mode TIA 58 receives the 1490 nm downstream data from optical fiber 11. An analog photodiode 60 receives the 1550 nm video signal from optical fiber 11. A triplexer module 62 generally includes triplexer 48, laser driver 52 which interfaces to laser 58, a burst-mode limit amplifier 59 that amplifies the output of the low level digital receiver formed by PIN photodiode 56 and burst-mode TIA 58, and a video circuit. In the illustrated embodiment, the video circuit of triplexer module 62 comprises analog photodiode 60, an analog photodiode matching network 63, an automatic gain controller (AGC) 64, an RF amplifier 66, and an RF output connector (not shown) that connects ONT 28A to subscriber equipment 30 such as a television. Burst-mode limit amplifier 59 transmits digital serial receive data to ONT MAC 68 which directs receive data to provide data and voice applications to a subscriber, e.g., for Ethernet and telephone services. Laser driver 52 receives digital serial data from ONT MAC 68 and laser 54 transmits the data upstream to OLT 12 over 1310 nm wavelengths of light via optical fiber link 11.

Most FTTP installations require voice and data, but only about half of these installations require analog video for CATV service. Consequently, a less expensive diplexer module 70 can be used with ONT 28A, instead of triplexer module 62, if no analog video is required. Diplexer module 70 is substantially the same as triplexer module 62, except that it does not include circuitry for processing analog video. Accordingly, diplexer module 70 includes a diplexer 72 that does not include analog photodiode 60 and the associated optics included in CWDM optics 50 for analog video applications. Diplexer 72 also does not include analog circuitry, i.e. matching network 63, AGC 64, RF amplifier 66, and RF output connector (not shown), for processing the analog video. Instead, diplexer 72 may simply include PIN diode 56, TIA 58, and laser 54, while diplexer module 70 may further incorporate limit amplifier 59 and laser driver 52.

Because not all FTTP installations require analog video as well as digital voice and data services, manufacturers typically maintain two different ONT designs. In these cases, diplexer module 72 is a subset of triplexer module 62 in the sense that diplexer module 72 includes diplexer 72, laser driver 52, and limit amplifier 59, but not the other components necessary to support analog video. FIG. 2 illustrates ONT 28A with a pluggable triplexer module 62 that includes triplexer 48, limit amplifier 59, and laser driver 52. Notably, diplexer 72 and diplexer module 70 are included in FIG. 2 merely for purposes of illustration since ONT 28A would not include both triplexer 48 and diplexer 72. Rather, ONT 28A comprises triplexer module 62 when video services are required, while diplexer module 70 is sufficient when no video services are required. In each case, the respective module 62 or 70 is plugged into a mounting socket attached to a circuit board associated with ONT 28A.

As will be described in detail, ONT 28A may comprise a mounting socket that accepts a pluggable module comprising either a dual-section triplexer card or a single-section diplexer card depending on the installation requirements. As a result, the manufacturer may build a generic ONT circuit board, thereby reducing the overhead cost. For example, the generic ONT may be tested with a dual-section triplexer module and then be shipped without a diplexer/triplexer module. An installation technician or another manufacturer may then install the appropriate diplexer or triplexer module depending on the installation requirements. The mounting socket accepts either a dual-section triplexer module, a single-section diplexer module, or a dual-section module carrying only diplexer components.

In addition, this feature may be particularly advantageous by allowing a vendor the ability to reconfigure an ONT by swapping a diplexer module for a triplexer module within the mounting socket for a customer who originally did not want video, and later decides to add video or, to upgrade the optics or circuitry by swapping the current module for a module with upgraded components. A vendor may be able to configure the type of PON transport by simply installing the pluggable diplexer/triplexer module on a selective basis. As an example, a vendor or installation technician may upgrade the optics from 1.2 Gbit downstream/622 Mbit upstream to 2.4 Gbit downstream/1.2 Gbit upstream by simply removing the subscriber's current pluggable diplexer/triplexer module and installing a pluggable diplexer/triplexer module with the required optics.

Figure 3:
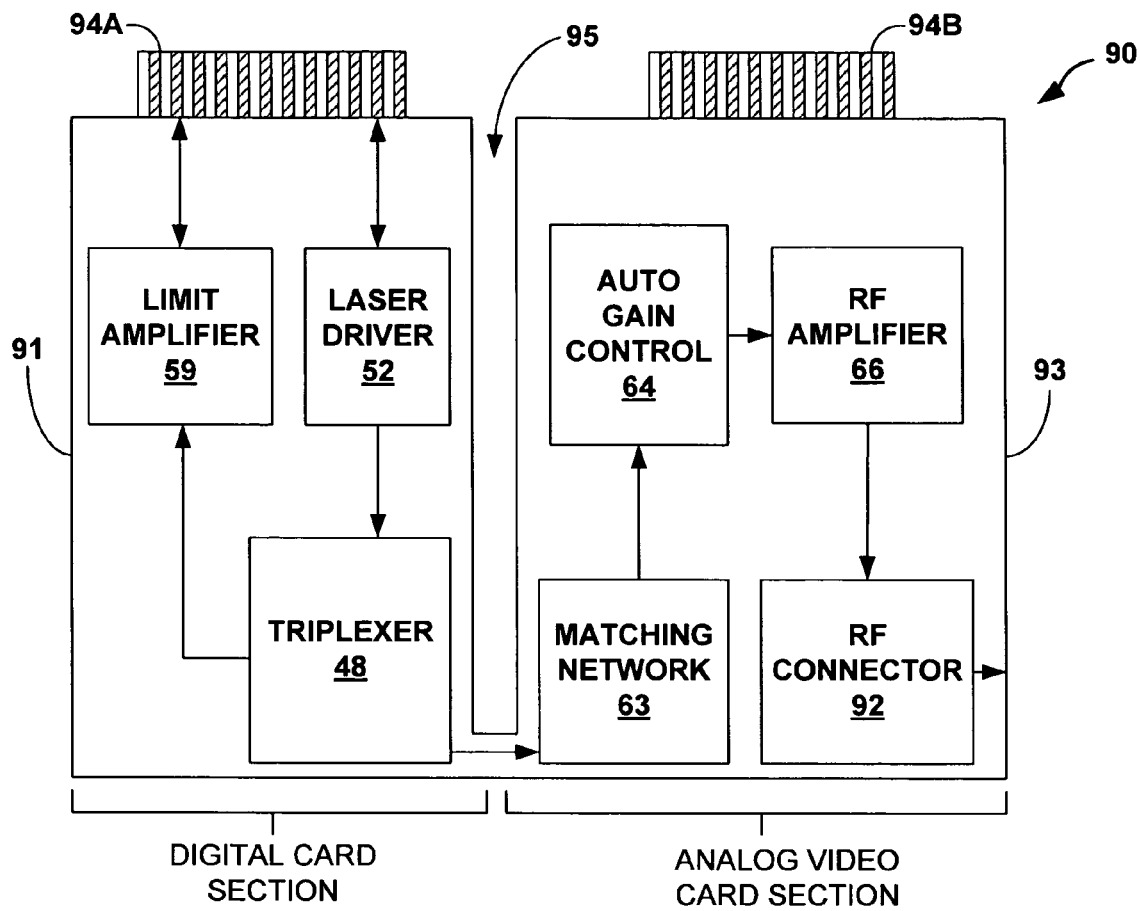
FIG. 3 is a top plan view of a pluggable triplexer module for use in an optical network terminal (ONT) of the PON.

FIG. 3 is a top plan view of a pluggable triplexer module 90 for use in an ONT. In general, pluggable triplexer module 90 may be constructed in a manner similar to a small form-factor pluggable (SFP) module. For example, module 90 may substantially conform to a form factor of a single small form factor pluggage (SFP) module standard or a dual SFP module standard. SFP is a standard for a new generation of optical modular transceivers designed for use with small form factor (SFF) connectors.

An SFP standard is set forth, for example, in the Small Form Factor Pluggable (SFP) Multisource Agreement, of September 2000, the entire content of which is incorporated herein by reference. The invention, including the module 90 and mounting socket, may generally conform with the respective SFP form factors described in the SFP Multisource Agreement, or other form factors that may exist or emerge in the future for pluggable modules. SFP pluggable triplexer module 90 may have a case or frame that surrounds the circuit card. The case or frame may be made of, for example, plastic or metal, and may be electrically insulative. However, the case has been omitted in FIG. 3 for clarity.

In the example of FIG. 3, pluggable triplexer module 90 may include two circuit card sections, i.e., a digital card section 91 and an analog video card section 93. The digital and analog card sections 91, 93 are coupled to one another to form the composite, dual-section triplexer module. Triplexer module 90 may be mounted in a case or a frame, which is omitted for ease of illustration. The case or frame may be sized to fit within a mounting socket that receives the dual-section triplexer module 90. The mounting socket may be mounted on an ONT circuit board, and may alternatively be referred to as a cage.

The digital card section 91 comprises triplexer 48, limit amplifier 59, and laser driver 52, while the analog video card section 93 comprises matching network 63, AGC 64, RF amplifier 66, and RF connector 92. RF connector 92 provides a coaxial connection to a coaxial cable (not shown) to provide output to televisions or set-top boxes within the premises. As previously described, triplexer 48 has three different ports: an analog port coupled to matching circuit of the analog card section, a digital receive output port coupled to the limit amplifier on the digital card section, and a digital transmit input port coupled to the laser driver on the digital card section. Consequently, triplexer 48 is coupled to components on both sections of triplexer module 90.

Each of the digital and analog sections 91, 93 of triplexer module 90 has connectors for connection to ONT processing circuitry, e.g., on the larger ONT circuit board (not shown). In particular, digital edge connector 94A and analog edge connector 94B (collectively "edge connectors 94") may protrude from one end of triplexer module 90 for engagement with reciprocal digital and analog edge connectors. The reciprocal edge connectors may be within a mounting socket (not shown) that receives triplexer module 90 and is mounted on the ONT circuit board (not shown).

Edge connector 94A on the digital card section 91 couples the digital circuit components of triplexer module 90, i.e., triplexer 48, limit amplifier 59, laser driver 52, to processing circuitry, such as an ONT MAC, on the ONT circuit board (not shown). Edge connector 94B on the analog section 93 of triplexer module 90 may couple the analog circuit components, i.e. matching network 63, AGC 64, RF amplifier 66, and RF connector 92 to power and ground provided by the ONT circuit board (not shown). Thus, edge connectors 94A, 94B provide a pluggable connection of triplexer module 90 to processing circuitry on the ONT circuit board via reciprocal edge connectors with the mounting socket. In addition, edge connector 94B may couple the analog circuitry of triplexer module 90 to a test interface of the ONT circuit board for diagnostic purposes.

Optionally, a gap 95 may be formed between the two card sections 91, 93, and designed to interlock with a slot formed in a dividing wall of a mounting socket to permit full insertion of the two adjacent card sections into the mounting socket. In the example of FIG. 3, gap 95 extends along substantially the entire length of pluggable triplexer module 90, but stops short of the end so that the two card sections remain structurally coupled to one another. The two card sections may be formed from a common printed circuit board. In this case, gap 95 may be cut into the board to substantially separate the sections. Alternatively, the two card sections 91, 93 may be fabricated independently and then bonded or otherwise connected together. Furthermore, because triplexer 48 electrically isolates the three output ports, the two card sections 91, 93 of triplexer module 90 can be electrically isolated, if necessary. This feature may be helpful in limiting the impact of electrical noise from the digital circuit (voice and data) on the analog circuit (video).

Alternatively, the dividing wall of the mounting socket may be removable or eliminated, in which case gap 95 may be unnecessary between card sections 91, 93. In this case, the dual section circuit card design of module 90 may be implemented without a gap and may be inserted in a dual SFP cage with a removable dividing wall, or a dual SFP cage without a dividing wall. In some cases, however, incorporation of gap 95 and a dividing wall may be desirable for suppression of electromagnetic interference between sections 91, 93.

In some embodiments, either with or without gap 95, a region between card section 91 and card section 93 may provide substantial electrical isolation of electrical and optical components carried on the respective card sections. In particular, either gap 95 or a region of the circuit card substantially conforming to gap 95 stands between first and second card sections 91, 93. Gap 95, or a region of the circuit card substantially conforming to gap 95, may contain substantially no electrically conductive traces or interconnections between components on first card section 91 and components on second card section 93.

In this manner, there may be substantially no electrical interconnections between the components on the first card section 91 and the second card section 93, as well as no conductive traces or patterns within gap 95 or a region conforming to the gap, which could otherwise generate undesirable electrical or electromagnetic interference between the components on the respective card sections.

In other embodiments, however, a limited number of conductive traces or patterns may extend across gap 95, or a region of the circuit board substantially conforming to gap 95, e.g., for the purpose of shared control of components with the card sections 91, 93. For example, a microcontroller on one card section 91 or 93 may be coupled to control functions of components on both card sections 91, 93. In general, card sections 91, 93 are functionally and structurally distinct and carry components directed to different functions, e.g., digital voice, data, and video in one card section, versus analog video in the other card section. Therefore, although card sections 91, 93 form part of a common circuit card, they generally may operate independently of one another and carry structurally and functionally distinct components.

Figure 4:
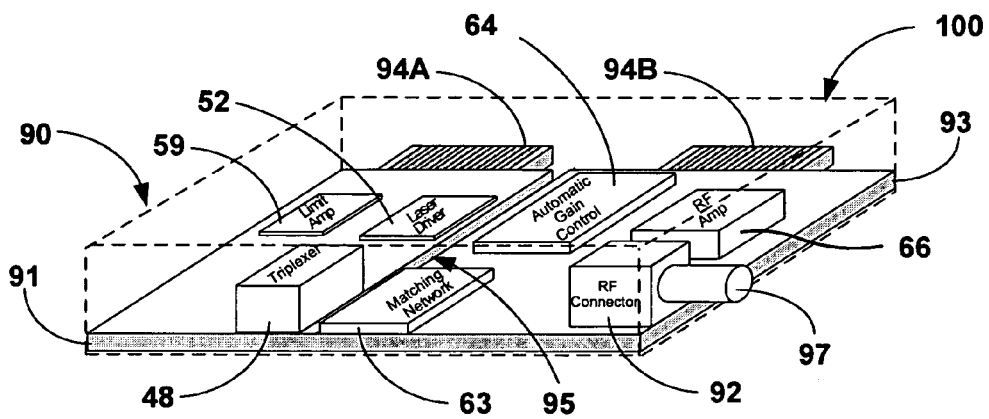
FIG. 4 is a perspective view of a pluggable triplexer module housed in a module case.

FIG. 4 is a perspective view of a pluggable triplexer module 90 housed in a module case 100, shown in dotted lines. Module case 100 may be made from plastic or metal and may be electrically insulative. In addition, module case 100 may be sized to fit within a mounting socket (not shown) that receives triplexer module 90 and is mounted to an ONT circuit board (not shown). For ease of illustration, the electrical connections between components of triplexer module 90 are not shown in FIG. 4.

Module case 100 may be fabricated to substantially enclose triplexer module 90 to prevent tampering with the digital and analog components of triplexer module 90, and protect such components from environmental conditions. Notably, an RF connector slot may be formed in module case 100 to accommodate RF connector 92, thereby allowing a coaxial cable 97 to be connected to RF connector 92. As an alternative, the analog video signal may be output via edge connector 94B, eliminating the need for an RF connector slot to accommodate RF connector 92. Edge connector slots may be formed in module case 100 to accommodate edge connectors 94, thereby allowing triplexer module 90 to couple to the ONT circuit board via reciprocal edge connectors within the mounting socket (not shown). For example, an installation technician may only have access to RF connector 92 and edge connectors 94 when installing pluggable triplexer module 90 in an ONT with a mounting socket capable of receiving triplexer module 90, in accordance with an embodiment of the invention. In some embodiments, edge connectors 94A, 94B may protrude from an end of module case 100. In other embodiments, one side of edge connectors 94A, 94B may be accessible via apertures formed in a bottom section of module case 100.

Figure 5:
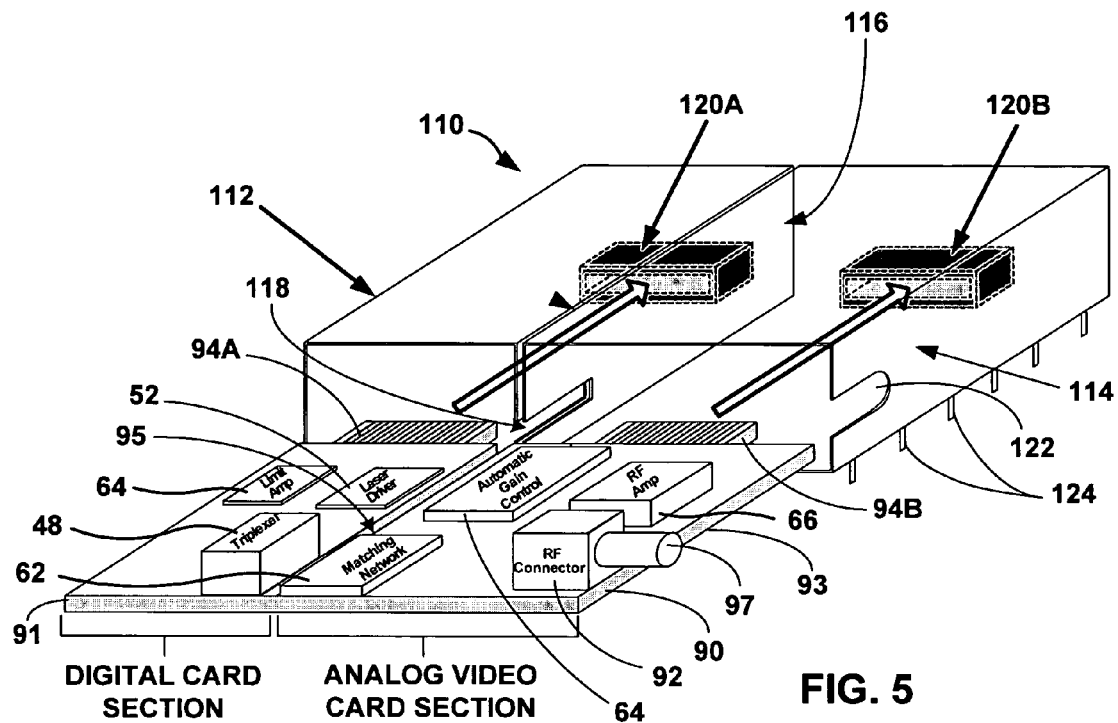
FIG. 5 is a perspective view illustrating a pluggable triplexer module and a mounting socket that receives the pluggable triplexer module for use in an ONT.

FIG. 5 is a perspective view illustrating a pluggable triplexer module 90 and a mounting socket 110 that receives the pluggable triplexer module for use in an ONT. Mounting socket 110 includes a first chamber 112, and a second chamber 114. Chambers 112, 114 receive the digital card section 91 and analog card section 93 of triplexer module 90, respectively. In some embodiments, mounting socket 110 may comprise a dual chamber electromagnetic interference (EMI)/Faraday shield. Chambers 112, 114 may be formed as separate chambers within an integral mounting socket 110. Alternatively, in some embodiments, mounting socket 110 may be formed by two separated mounting sockets placed side-by-side with one another, in which case each chamber 112, 114 is formed by a respective socket.

As shown in FIG. 5, mounting socket 110 may include a dividing wall 116 that separates first and second chambers 112, 114 and a mounting slot 118 formed in dividing wall 116. Dividing wall 116 separates first and second chambers 112, 114 and provides shielding from EMI and electrical isolation of the digital and analog card sections 91, 93 of triplexer module 90. In the illustrated embodiment, gap 95 formed between the digital and analog sections 91, 93 is designed to interlock with mounting slot 118 to permit full insertion of the two card sections into first and second chambers 112, 114, respectively.

However, in an alternative embodiment, dividing wall 116 of mounting socket 110 may be removable, and need not include mounting slot 118. In this manner, mounting socket 110 may optionally accommodate a dual section triplexer module 90 without a gap 95. For example, mounting socket 110 may include grooves or slots along the top and bottom with which dividing wall 116 interfaces in order to allow dividing wall 116 to be easily removed from mounting socket 110. The grooves or slots may extend along the length of the top and bottom inner surfaces of mounting socket 110 and serve to hold dividing wall 116 in place within mounting socket 110 as well as guide dividing wall into place during removal or insertion. In this case, triplexer module 90 may not have a gap 95 formed between digital card section 91 and analog card section 93 since dividing wall 116 may be easily removed from mounting socket 110 in order to accommodate triplexer module 90.

An RF connector slot 122 may be formed in mounting socket 110 to accommodate a protruding portion of RF connector 92 as triplexer module 90 is plugged into the mounting socket. RF connector slot 122 may accommodate a coaxial cable 97 protruding laterally from the analog video card section 93 upon connection to RF connector 92. As previously described, in some embodiments, RF connector slot 122 need not be formed in mounting socket 110 when the analog video signal is output via edge connector 94B.

Mounting socket 110 may be mounted on an ONT circuit board (not shown) carrying ONT processing circuitry. In some cases, mounting socket 110 may be mounted to the ONT circuit board (not shown) via solder connections 124. The ONT circuit board is partially shown in FIG. 6, but not in FIG. 5. Again, the electrical connections between components of triplexer module 90 are not shown in FIG. 5 for ease of illustration.

As further shown in FIG. 5, first and second chambers 112, 114 are designed to receive the digital and analog card sections 91, 93 of triplexer module 90 to provide a pluggable connection to an ONT circuit board (not shown). First chamber 112 is designed to receive the digital card section 91, which carries digital circuitry and includes a digital edge connector 120A. Edge connector 120A may be formed at one end of first chamber 112 of mounting socket 110 and is coupled to processing circuitry on the ONT circuit board (not shown). Edge connector 94A of triplexer module 90 is plugged into reciprocal edge connector 120A within mounting socket 110, thereby connecting the digital circuitry of triplexer module 90 to the processing circuitry of the ONT circuit card.

Similarly, second chamber 114 is designed to receive the analog video card section 93 of triplexer module 90, which carries analog circuitry and includes an analog edge connector 120B. Edge connector 120B may be formed at one end of second chamber 114 of mounting socket 110 and may simply be coupled to power and ground provided by the ONT circuit board (not shown). Edge connector 94B of triplexer module 90 is plugged into reciprocal edge connector 120B within mounting socket 110, thereby connecting the analog circuitry of triplexer module 90 to the power and ground buses provided by the processing circuitry of the ONT circuit card (not shown). In addition, the analog circuitry of triplexer module 90 may be coupled to a test interface of the ONT circuit card for system diagnostic purposes.

Notably, mounting socket 110 may be used to accommodate installation of triplexer module 90 or a pluggable diplexer module (not shown). As will be described, a pluggable diplexer module may be formed by populating a dual-section card, such as the dual-section card of triplexer module 90, with only those components necessary for the diplexer application. For example, a manufacturer may generate a generic dual-section card and populate each card with either diplexer or triplexer components.

Figure 9:
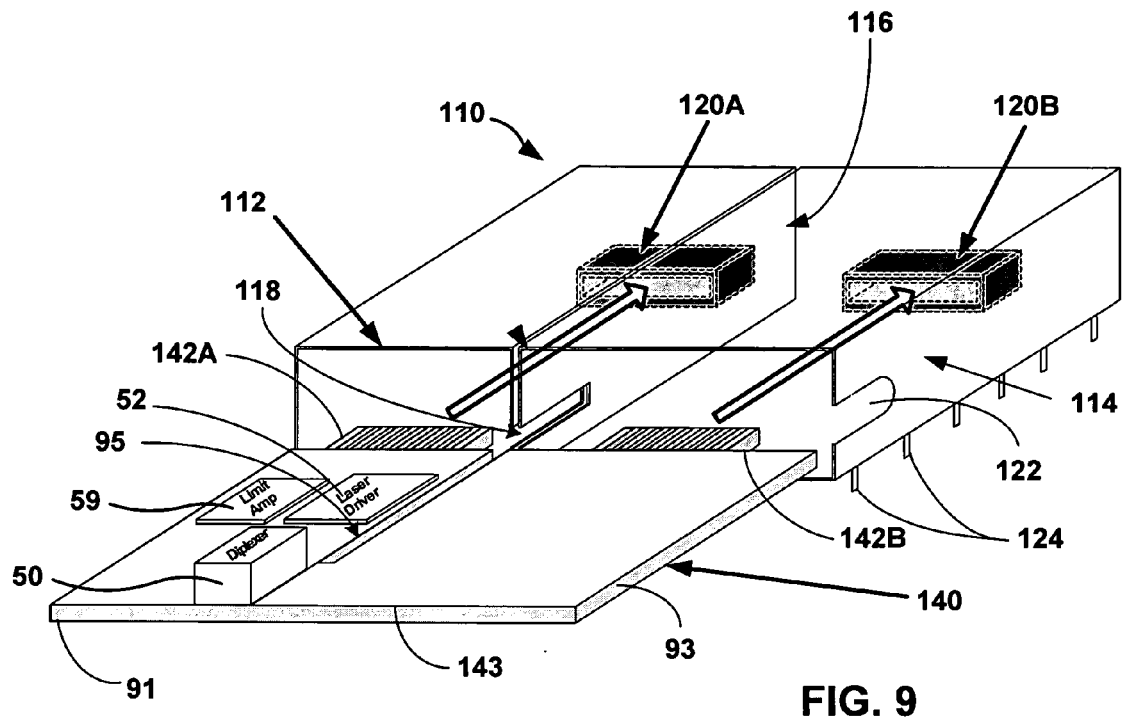
FIG. 9 is a perspective view illustrating the insertion of the diplexer module of FIG. 7 in the mounting socket of FIG. 5.

A pluggable diplexer module may include all the appropriate digital circuitry, as shown in FIG. 2 with diplexer module 50, on a single section of the dual-section card. Consequently, the pluggable diplexer module formed on a dual-section card may be received by mounting socket 110 in the same manner as triplexer 90, as shown in FIG. 9, but without analog circuitry coupled to the ONT circuit board (not shown).

Figure 12:
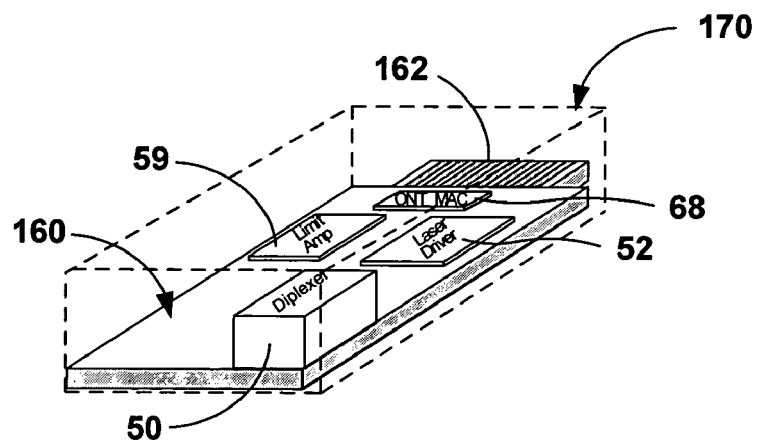
FIG. 12 is a perspective view illustrating the diplexer module of FIG. 11 housed in a module case.

Alternatively, a pluggable diplexer module may include the appropriate digital circuitry on a single section diplexer card. The single section diplexer card may be sized to fit within first chamber 112, as shown in FIG. 12. In the case of a single-section diplexer card, second chamber 114 remains empty. Yet, second chamber 114 is available in the event the diplexer card is replaced with a triplexer card to add video capabilities for a particular subscriber.

Figure 6:
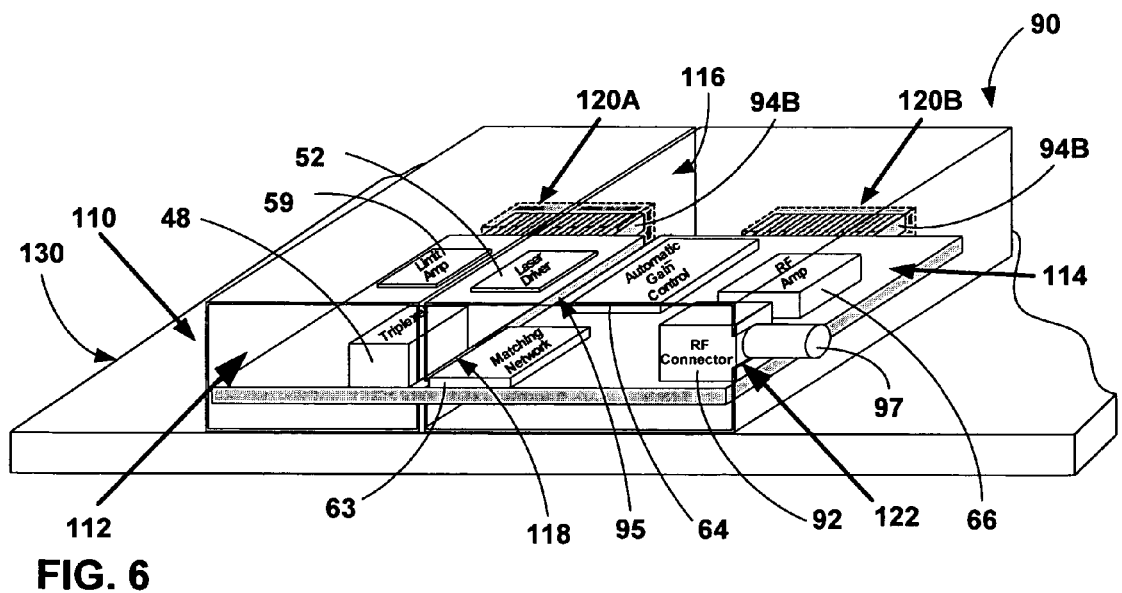
FIG. 6 is a perspective view illustrating a pluggable triplexer module housed in a mounting socket.

FIG. 6 is a perspective view illustrating a pluggable triplexer module 90 housed in a mounting socket 110. Mounting socket 110 may be mounted to an ONT circuit board 130, which is partially shown. Mounting socket 110 is sized to accommodate triplexer module 90 so that, upon insertion, triplexer module 90 is substantially enclosed within mounting socket 100. Edge connectors 94A, 94B of triplexer module 90 provide a pluggable connection to processing circuitry on ONT circuit board 130 via reciprocal edge connectors 120A and 120B, respectively, within mounting socket 110.

In some embodiments, mounting socket 110 may include an access door or doors (not shown), which provide access to the dual chambers 112, 114 of mounting socket 110 and serve to fully enclose triplexer module 90 after it has been fully inserted within mounting socket 110, or prior to insertion of the triplexer module. The access doors may further shield triplexer module 90 from EMI. For example, a single access door may serve to fully cover the open-ended sides of each of chambers 112, 114 of mounting socket 110 through which triplexer module 90 is inserted. Each access door may rotate along a hinge to provide access to a compartment of mounting socket 110.

Figure 7:
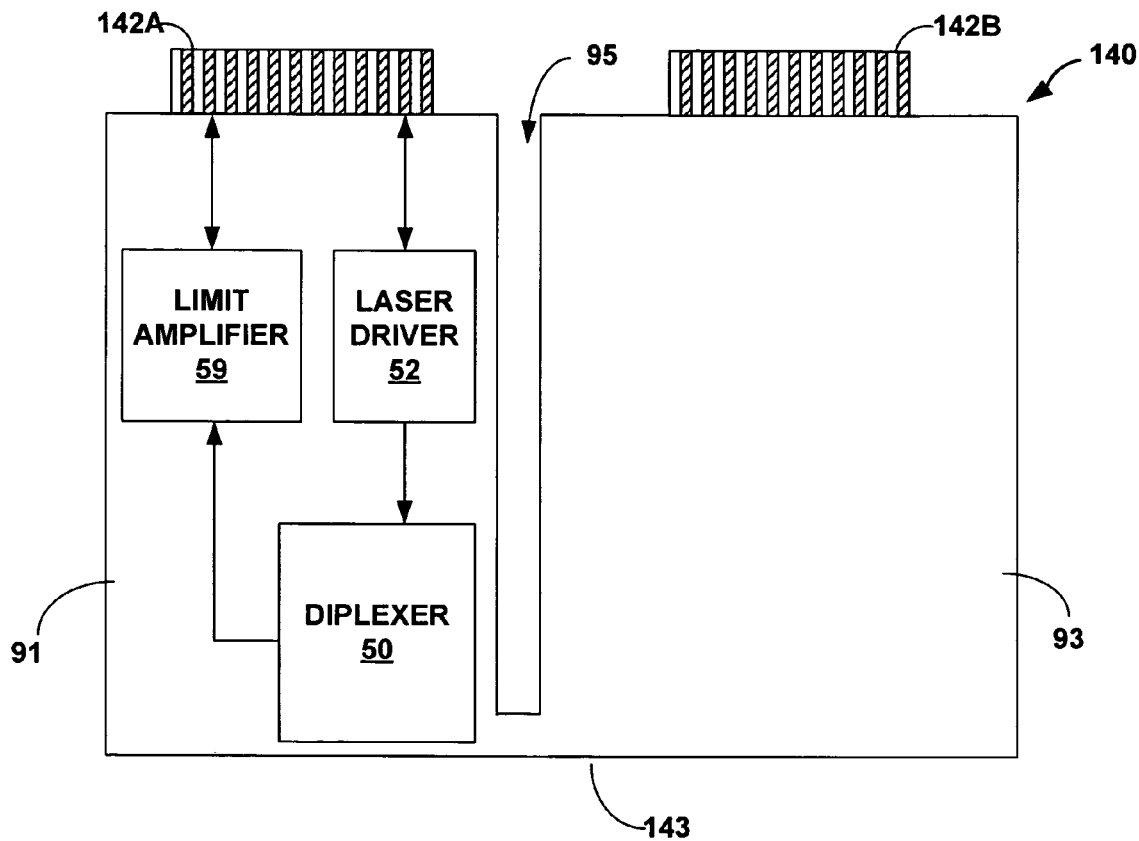
FIG. 7 is a top plan view of a pluggable diplexer module formed in single section of a dual-section circuit card.

FIG. 7 is a top plan view of pluggable diplexer module 140 for use in ONT 28A of PON 10. Diplexer module 140 is sufficient when no video services are required. Diplexer module 140 may be formed by populating a dual-section circuit card with only the components necessary for digital voice and data applications. In particular, diplexer module 140 is designed to be mounted in mounting socket 110 and may comprise the digital circuitry illustrated in FIG. 2, i.e. diplexer 50, limit amplifier 59, and laser driver 52. As shown in FIG. 7, the digital circuitry may be populated on a single section 91 of a dual-section circuit card 143. The other section 93 of card 143, which would ordinarily carry analog video circuitry, need not be populated with any circuit components in the example of FIG. 7.

The dual-section circuit card may be of the same type as the circuit card used to form triplexer module 90 of FIG. 5. Consequently, diplexer module 140 may be constructed similarly to triplexer module 90 as the digital circuitry in card section 91 remains the same, with only the optics within diplexer 50 differing from the optics within triplexer 48. By forming diplexer module 140 in the manner shown in FIG. 7, a manufacturer may build a generic dual-section circuit card and form either diplexer module 140 or triplexer module 90 by selectively populating the sections 91, 93 of the dual-section circuit card with the components appropriate for an intended application.

Diplexer module 140 may generally be constructed in a manner similar to a SFP module thereby allowing a vendor to selectively change the type PON transport by simply inserting diplexer module 140 or triplexer module 90 within mounting socket 100. Again, a gap 95 formed between the two card sections 91, 93 of diplexer module 140 is designed to interlock with mounting slot 118 of mounting socket 110 to permit full insertion within mounting socket 110. Diplexer module 140 may have a case or frame that surrounds the circuit card. The case or frame may be made of plastic and may be electrically insulative. However, the case has been omitted in FIG. 7 for clarity.

As previously described, diplexer 50 includes optics for separating 1310 nm and 1490 nm wavelengths of light for transmitting and receiving digital information. Limit amplifier 59 transmits digital serial receive data to processing circuitry on an ONT circuit board (not shown) which directs receive data to provide data and voice applications to a subscriber. Laser driver 70 receives digital serial data from the processing circuitry on the ONT circuit board (not shown) and transmits the data upstream to OLT 12 over optical fiber link 11.

Edge connector 142A provides a pluggable connection that couples the digital circuitry of diplexer module 140 to processing circuitry on the ONT circuit board (not shown). Edge connector 142B may not be electrically connected to any components of diplexer module 140 thereby serving no functional purpose for diplexer module 140. Consequently, in some embodiments, diplexer module 140 may be fabricated without edge connector 142B without affecting performance. However, diplexer module 140 may include edge connector 142B as illustrated to facilitate generic manufacturer of the dual-section circuit card 143 for use in either a diplexer module or a triplexer module.

Edge connector 142A and 142B (collectively "edge connectors 142") may protrude from one end of diplexer module 140 for engagement with reciprocal edge connectors, such as edge connectors 120 of mounting socket 110, thereby electrically connecting diplexer module 140 to the processing circuitry of an ONT circuit board. In addition, edge connectors 142 may couple diplexer module 140 to a test interface of an ONT circuit board for diagnostic purposes.

By permitting diplexer module 140 and triplexer module 90 to be interchanged based on the requirements of a given subscriber, two versions of an ONT (with and without video) do not need to be maintained. This feature may be particularly useful if a customer originally did not want video, but later desires to add video. As a result, a flexible diplexer/triplexer module, such as triplexer module 90 and diplexer module 140, may reduce the overhead cost of a manufacturer. A vendor may be able to change the type of PON transport by simply installing either diplexer module 140 or triplexer module 90 based on the requirements of a given subscriber. The ability to reconfigure the ONT by swapping out diplexer module 140 and triplexer module 90 eliminates the need for a manufacturer to maintain two different versions of the ONT.

Figure 8:
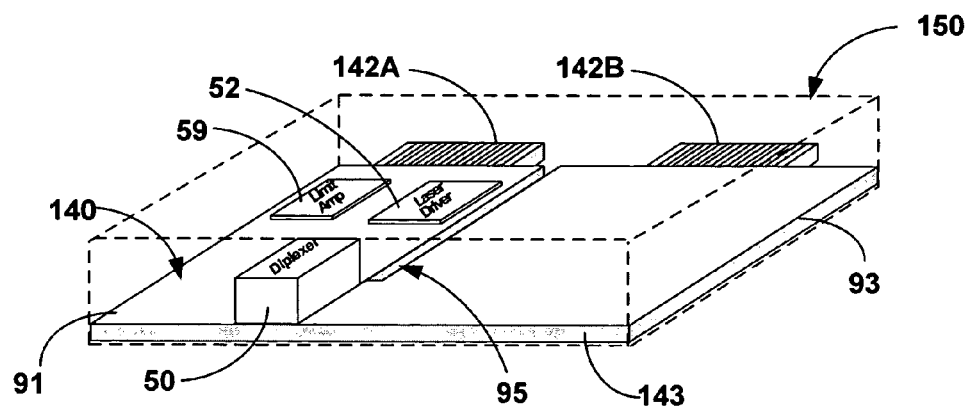
FIG. 8 is a perspective view illustrating the diplexer module of FIG. 7 housed in a module case.

FIG. 8 is a perspective view illustrating diplexer module 140 housed in a module case 150, shown in dotted lines. Module case 150 may be constructed similar to module case 100 (FIG. 4). In particular, module case 150 may be made from plastic and may be electrically insulative. In addition, module case 150 may be sized to fit within mounting socket 110 that receives diplexer module 140 and is mounted to an ONT circuit board (not shown).

Figure 10:
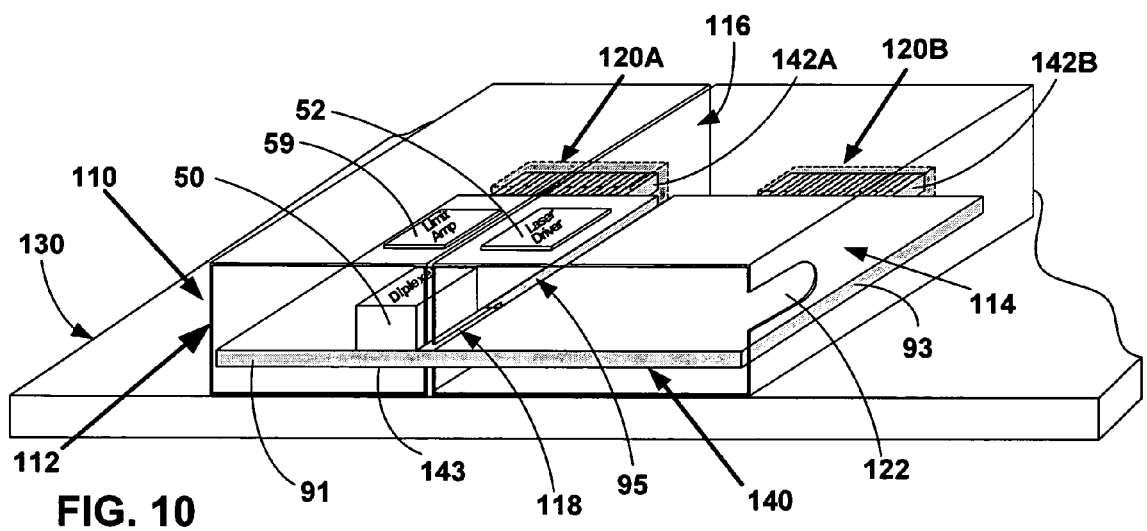
FIG. 10 is a perspective view of the diplexer module of FIG. 7 plugged into the mounting socket of FIG. 5, with the mounting socket attached to a circuit board.

FIG. 9 is a perspective view illustrating the insertion of diplexer module 140 in mounting socket 110. FIG. 10 is a perspective view of the diplexer module 140 plugged into the mounting socket 110, with the mounting socket attached to an ONT circuit board 130. Again, mounting socket 110 includes first and second chambers 112, 114 that receive first and second card sections 91, 93, respectively, of card 143. Not shown in FIGS. 9 and 10 is the module case 150 of FIG. 8, which encloses card sections 91, 93, and is also shaped for insertion into chambers 112, 114 of mounting socket 110. Card sections 91, 93 typically will be housed within module case 150. Other than the absence of analog video electronics from card section 93, diplexer module 140 and mounting socket 110 may conform substantially to triplexer module 90 and mounting socket 110 of FIGS. 5 and 6.

Figure 11:
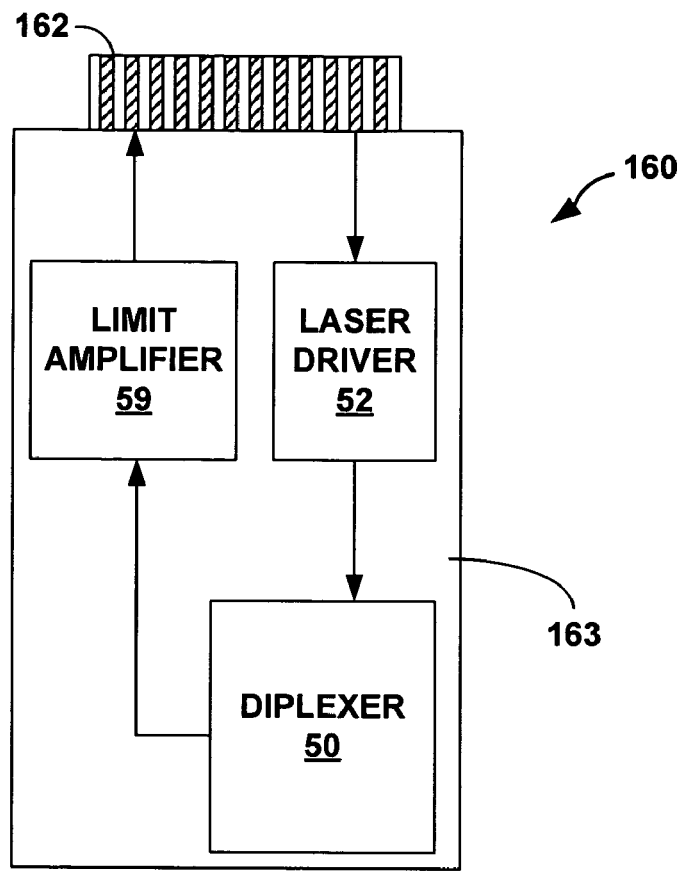
FIG. 11 is a top plan view of a diplexer module formed on a single-section circuit card.

FIG. 11 is a top plan view of a diplexer module 160 formed on a single-section circuit card 163. In general, diplexer module 160 may be formed by populating a single section circuit card 163 with only the components necessary for digital voice and data applications. Diplexer module 160 may comprise the same digital circuitry as diplexer module 140. For example, diplexer module 160 may comprise the digital circuitry illustrated in FIG. 2, i.e. diplexer 50, limit amplifier 59, and laser driver 52. Moreover, diplexer module 160 may be sized to fit within first compartment 112 of mounting socket 110, thereby allowing diplexer module 160 to be selectively installed in the previously described generically fabricated ONT circuit board, which carries a dual-chamber mounting socket 110.

Diplexer module 160 may be similarly constructed to diplexer 140. Forming diplexer module 160 on a single section of circuit board may reduce manufacturing cost because diplexer module 160 does not include the excess material of a dual-section circuit board. Diplexer module 160 may have a case or frame that surrounds the circuit card. The case or frame may be made of plastic and may be electrically insulative. However, the case has been omitted in FIG. 11 for clarity. The case or frame may include a slot for edge connector 162, which provides a pluggable connection that couples the digital circuitry of diplexer module 160 to processing circuitry on an ONT circuit board (not shown). Edge connector 162 may protrude from one end of diplexer module 160 for engagement with a reciprocal edge connector 120 of mounting socket 110, thereby electrically connecting diplexer module 160 to the processing circuitry of an ONT circuit board.

FIG. 12 is a perspective view illustrating diplexer module 160 housed in a module case 170 showed in dotted lines. Module case 170 may be constructed similar to module case 150 (FIG. 8), but it is smaller in size than module case 150 as the diplexer module 160 is formed on a single section circuit card and is designed to fit within first compartment 112 of mounting socket 110. Consequently, module case 170 may be sized to fit within first compartment 112 of mounting socket 110. Module case 170 may be made from plastic and may be electrically insulative.

Figure 13:
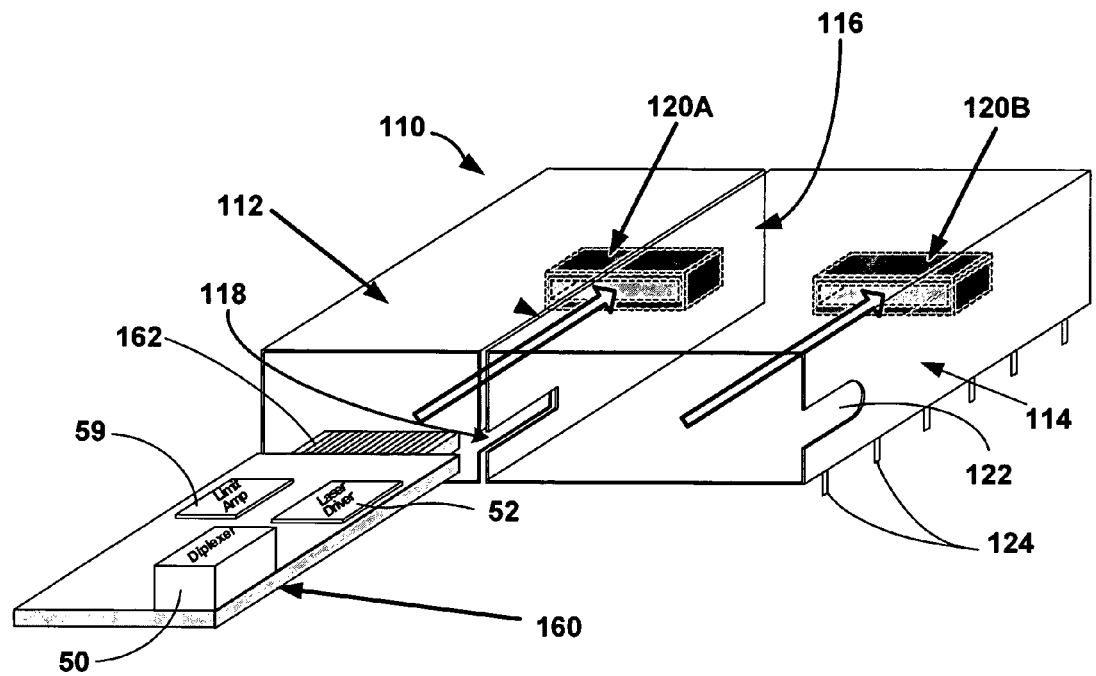
FIG. 13 is a perspective view illustrating insertion of the diplexer module of FIG. 12 plugged into a single chamber of the mounting socket of FIG. 5.
Figure 14:
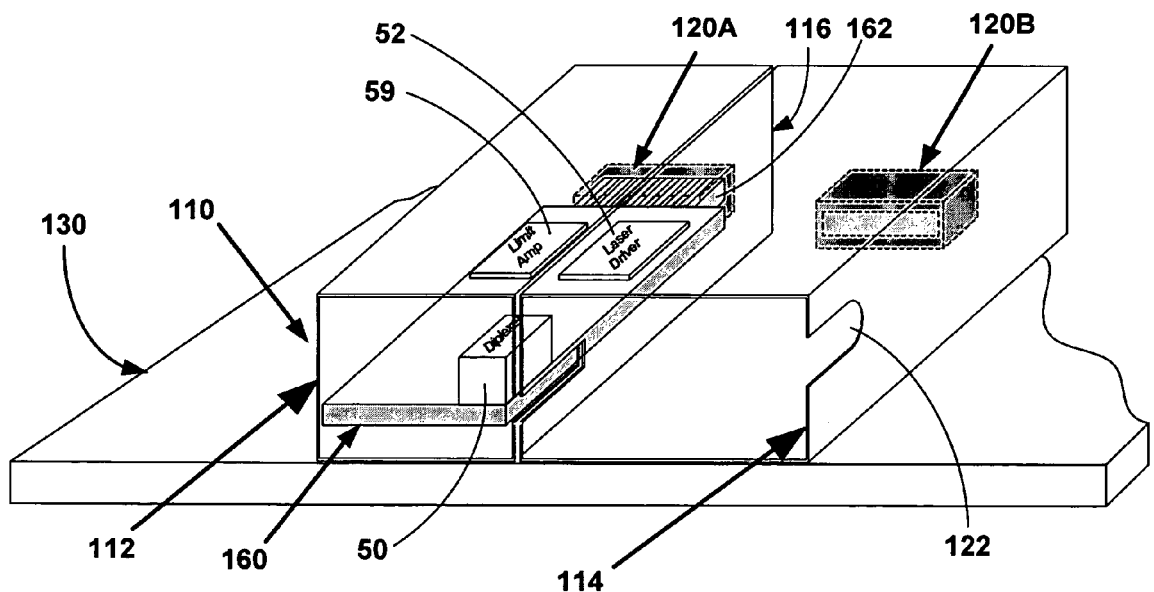
FIG. 14 is a perspective view illustrating the diplexer module of FIG. 11 plugged into the mounting socket of FIG. 5, with the mounting socket attached to a circuit board.

FIG. 13 is a perspective view illustrating insertion of the diplexer module 160 of FIGS. 11 and 12 into a single chamber 112 of the mounting socket 110. FIG. 14 is a perspective view illustrating diplexer module 160 plugged into mounting socket 110, with the mounting socket attached to a circuit board 130. Notably, second chamber 114 is empty in the example of FIG. 14. Edge connector 162 of diplexer module 160 is plugged into reciprocal edge connector 120A of mounting socket 110, thereby electrically connecting the digital circuitry of diplexer module 160 to the processing circuitry of the ONT circuit board 130. Dividing wall 116 separates first and second chamber 112, 114 and provides shielding from EMI. Module case 170 is not shown in FIGS. 13 and 14, but houses circuit board 160 and is likewise inserted into first chamber 112.

Figure 15:
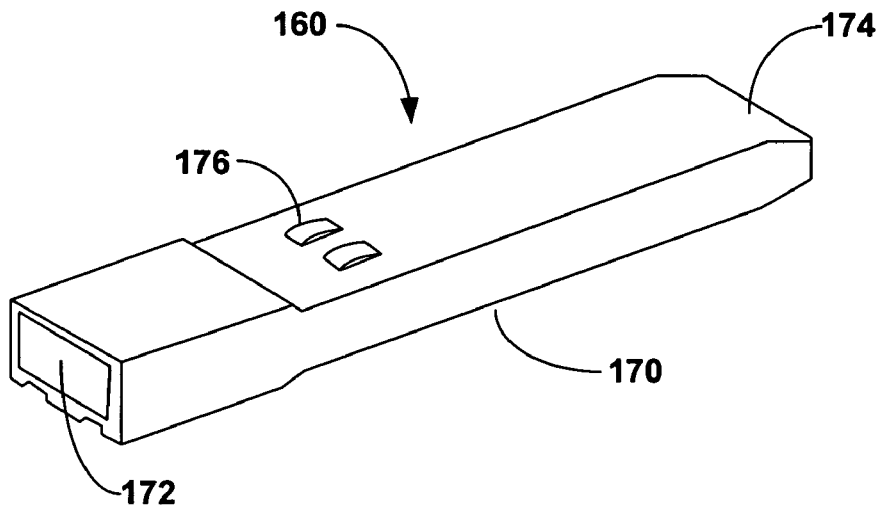
FIG. 15 is a perspective view illustrating an exemplary pluggable module case for a single-section diplexer module.

FIG. 15 is a perspective view illustrating an exemplary pluggable module case 170 for a single-section diplexer module 160. Module case 170 may be used to house a single-section circuit board 163, as shown in FIGS. 11-14. In the example of FIG. 15, module case 170 includes a leading end 174 for insertion into a mounting socket and a trailing end 172. Leading end 174 may have a tapered profile to facilitate insertion into the mounting socket. One or more spring elements 176 may be included to provide a spring-biased engagement with the mounting socket. A circuit board 163, mounted within module case 170, may include an edge connector that protrudes from leading end 174, or is accessible from an opening in a bottom surface of the module case.

Figure 16:
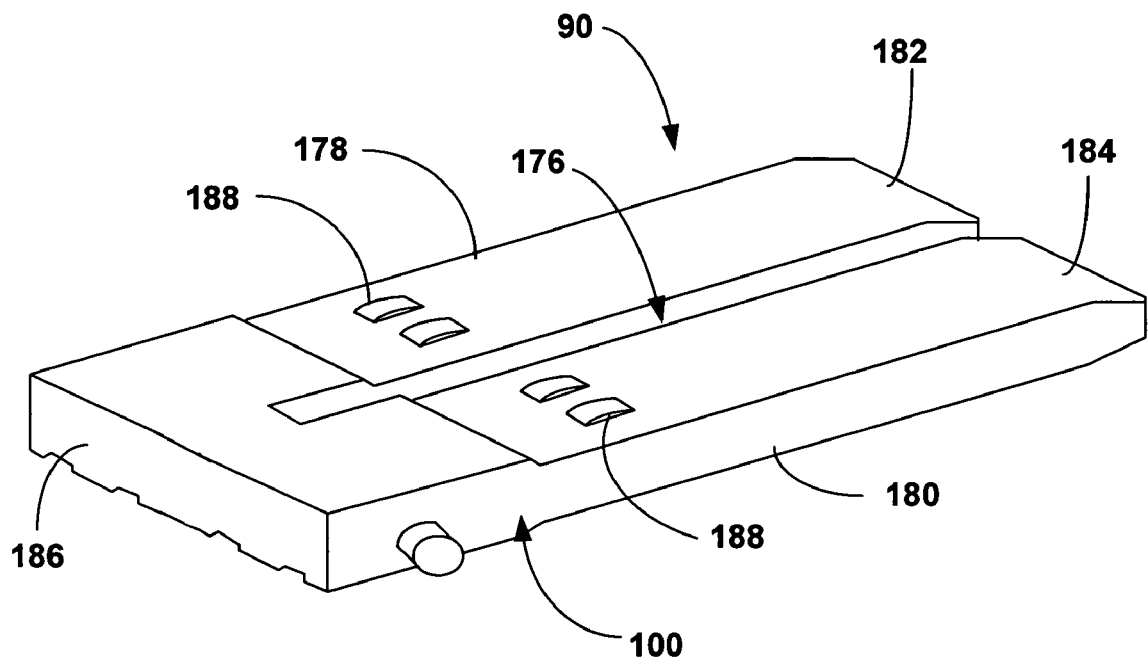
FIG. 16 is a perspective view illustrating an exemplary pluggable module case for a dual-section diplexer or triplexer module.

FIG. 16 is a perspective view illustrating an exemplary pluggable module case 100 for a dual-section triplexer module 90. Module case 100 may be used to house a dual-section circuit board 93, as shown in FIGS. 3-6. Module case 100 also may be used to house a dual-section diplexer module. In the example of FIG. 16, module case 100 includes a first section 178 which houses a digital card section 91, and a second section 180 that houses an analog video card section 93. An optional gap 176 is formed between the first and second case sections 178, 180 to permit interlocking engagement of module 90 with a slot 118 defined in a dividing wall 116 of a mounting socket 110, as shown in FIGS. 5 and 6. Each section 178, 180 includes a respective leading end 182, 184 and a trailing end 186. Alternatively, module case 100 need not include gap 176 when dividing wall 116 of mounting socket 110 may be easily removed or is otherwise eliminated. One or more spring elements 188 may be provided to support a spring-biased connection with mounting slot 110.

Various embodiments of the invention have been described. These and other embodiments are within the scope of the following claims.

The invention claimed is:

1. A triplexer module for use in an optical network terminal (ONT) for use in an optical network, the triplexer module comprising:
   a circuit card;
   a triplexer mounted on the circuit card;
   digital circuitry, coupled to the triplexer and mounted on the circuit card, that processes digital information;
   analog video circuitry, coupled to the triplexer and mounted on the circuit card, that processes analog video information; and
   a pluggable module case containing at least a portion of the circuit card, triplexer, digital circuitry and analog video circuitry,
   wherein the pluggable module case substantially conforms to a form factor of a dual pluggable module sized to fit within a mounting socket comprising a dual pluggable module cage.

2. The triplexer module of claim 1, wherein the circuit card defines a gap that substantially separates the digital circuitry and the analog video circuitry.

3. The triplexer module of claim 2, wherein the gap is sized to permit insertion of the triplexer module into the mounting socket, the mounting socket having a first chamber and a second chamber separated by a dividing wall such that the digital circuitry resides within the first chamber and the analog video circuitry resides within the second chamber, and wherein the dividing wall has a slot oriented to interlock with the gap.

4. The triplexer module of claim 1, wherein the digital circuitry is configured to process digital data and digital voice information.

5. The triplexer module of claim 1, wherein the analog video circuitry is configured to process analog cable television information.

6. The triplexer module of claim 1, wherein the triplexer transmits a first optical signal carrying digital information in a first wavelength range, receives a second optical signal carrying digital information in a second wavelength range, and receives a third optical signal carrying analog video information in a third wavelength range.

7. The triplexer module of claim 1, further comprising a radio frequency (RF) connector mounted on the circuit card that couples to the analog video circuitry.

8. The triplexer module of claim 7, wherein at least a portion of the RF connector protrudes through the pluggable module case.

9. The triplexer module of claim 1, wherein the digital circuitry includes a laser driver.

10. The triplexer module of claim 1, wherein the pluggable module case substantially conforms to a form factor of a dual small form factor pluggable (SFP) module sized to fit within a mounting socket comprising a dual SFP module cage.

11. The triplexer module of claim 1, further comprising a first connector coupled to the digital circuitry, and a second connector coupled to the analog video circuitry, wherein the first and second connectors protrude from the pluggable module case for engagement with reciprocal connectors on a circuit board.

12. The triplexer module of claim 1, wherein the digital circuitry and analog video circuitry are substantially electrically isolated from one another.

13. The triplexer module of claim 1, wherein the triplexer, the digital circuitry and the analog video circuitry are configured for use in an ONT of a passive optical network (PON).

14. A triplexer system for use in an optical network terminal (ONT) for use in an optical network, the triplexer system comprising:
   a triplexer module including:
      a circuit card,
      a triplexer mounted on the circuit card,
      digital circuitry, coupled to the triplexer and mounted on the circuit card, that processes digital information,
      analog video circuitry, coupled to the triplexer and mounted on the circuit card, that processes analog video information, and
      a pluggable module case containing at least a portion of the circuit card, triplexer, digital circuitry and analog video circuitry; and
   a mounting socket, mounted on an ONT circuit board, that receives at least a portion of the triplexer module,
   wherein the mounting socket comprises a dual pluggable module cage, and the pluggable module case substantially conforms to a form factor of a dual pluggable module sized to fit within the mounting socket comprising the dual pluggable module cage.

15. The triplexer system of claim 14, wherein the mounting socket includes a first chamber to receive the digital circuitry and a second chamber to receive the analog video circuitry, the circuit card defines a gap that substantially separates the digital circuitry and the analog video circuitry, and wherein the mounting socket includes a dividing wall having a slot oriented to interlock with the gap.

16. The triplexer system of claim 14, further comprising:
   a first connector mounted on the circuit card;
   a second connector mounted on the circuit card;
   a first reciprocal connector that mates with the first connector; and
   a second reciprocal connector that mates with the second connector,
   wherein the first connector and the first reciprocal connector couple the digital circuitry to circuitry on the ONT circuit board, and
   wherein the second connector and the second reciprocal connector couple the analog video circuitry to a source of power on the ONT circuit board.

17. The triplexer system of claim 14, wherein the digital circuitry is configured to process digital data and digital voice information.

18. The triplexer system of claim 14, wherein the analog video circuitry is configured to process analog cable television information.

19. The triplexer system of claim 14, wherein the triplexer transmits a first optical signal carrying digital information in a first wavelength range, receives a second optical signal carrying digital information in a second wavelength range, and receives a third optical signal carrying analog video information in a third wavelength range.

20. The triplexer system of claim 14, further comprising a radio frequency (RF) connector mounted on the circuit card that couples to the analog video circuitry.

21. The triplexer system of claim 20, wherein at least a portion of the RE connector protrudes through the pluggable module case.

22. The triplexer system of claim 14, wherein the digital circuitry includes a laser driver and the ONT circuit board includes medium access control (MAC) circuitry.

23. The triplexer system of claim 14, wherein the dual pluggable module cage comprises a dual small form factor pluggable (SFP) module cage, and wherein the pluggable module case substantially conforms to a form factor of a dual SFP module case sized to fit within the mounting socket comprising the dual SFP module cage.

24. The triplexer system of claim 14, wherein the digital circuitry and the analog video circuitry are substantially electrically isolated from one another.

25. The triplexer system of claim 14, wherein the triplexer, the digital circuitry and the analog video circuitry are configured for use in an ONT of a passive optical network (PON).

26. A triplexer system for use in an optical network terminal (ONT) for use in an optical network, the triplexer system comprising a mounting socket, mounted on an ONT circuit board, that receives at least a portion of a pluggable triplexer module, the mounting socket including a first chamber to receive at least a portion of digital circuitry of a triplexer module, and a second chamber to receive at least a portion of analog video circuitry of the triplexer module, the triplexer system further comprising a dividing wail having a slot oriented to interlock with a gap defined between the digital circuitry and the analog video circuitry of the triplexer module.

27. The triplexer system of claim 26, further comprising a removable dividing wall within the mounting socket.

28. The triplexer system of claim 26, further comprising:
   a first reciprocal connector that mates with a first connector of the triplexer module; and
   a second reciprocal connector that mates with a second connector of the triplexer module,
   wherein the first connector and the first reciprocal connector couple the digital circuitry to circuitry on the ONT circuit board, and
   wherein the second connector and the second reciprocal connector couple the analog video circuitry to a source of power on the ONT circuit board.

29. The triplexer system of claim 26, further comprising a slot defined by the second chamber, the slot permitting at least a portion of a radio frequency (RF) connector in the second card section of the triplexer module to protrude outward from the second chamber.

30. The triplexer system of claim 26, wherein at least one of the first and second chambers substantially conforms to a form factor of a small form factor pluggable (SFP) module standard.

31. The triplexer system of claim 26, wherein the optical network comprises a passive optical network (PON).

32. A diplexer module for use in an optical network terminal (ONT) for use in an optical network, the diplexer module comprising:
   a circuit card;
   a diplexer mounted on the circuit card;
   digital circuitry, coupled to the diplexer and mounted on the circuit card, that processes digital information; and
   a pluggable module case containing at least a portion of the circuit card, diplexer, and digital circuitry,
   wherein the circuit card includes a first card section and a second card section, the diplexer is mounted on the first card section, the digital circuitry is coupled to the diplexer and mounted on the first card section, and substantially no circuitry is mounted on the second card section, and
   wherein the circuit card defines a gap that substantially separates a portion of the first card section and a portion of the second card section, and wherein the gap is sized to permit insertion of the diplexer module into a mounting socket having a first chamber and a second chamber separated by a dividing wall such that a portion of the first card section resides within the first chamber and a portion of the second card section resides within the second chamber.

33. The diplexer module of claim 32, further comprising a connector coupled to the digital circuitry, wherein the connector protrudes from the pluggable module case for engagement with a reciprocal connector on a circuit board.

34. The diplexer module of claim 32, further comprising a first connector coupled to the digital circuitry and a second connector that is not coupled to the digital circuitry, wherein the first and second connectors protrude from the pluggable module case for engagement with reciprocal connectors on a circuit board.

35. The diplexer module of claim 32, wherein the digital circuitry is configured to process digital data and voice information, and wherein the diplexer transmits a first optical signal carrying digital information in a first wavelength range, and receives a second optical signal carrying digital information in a second wavelength range.

36. The diplexer module of claim 32, wherein the pluggable module case substantially conforms to a form factor of a small form factor pluggable (SFP) module standard.

37. The diplexer module of claim 32, wherein the diplexer and the digital circuitry are configured for use in an ONT of a passive optical network (PON).

38. A diplexer system for use in an optical network terminal (ONT) for use in an optical network, the triplexer system comprising:
a diplexer module including:
a circuit card,
a diplexer mounted on the circuit card,
digital circuitry, coupled to the diplexer and mounted on the circuit card, that processes digital information, and
a pluggable module case containing at least a portion of the circuit card, diplexer, and digital circuitry,
wherein the circuit card includes a first card section and a second card section, the diplexer is mounted on the first card section, the digital circuitry is coupled to the diplexer and mounted on the first card section, and substantially no circuitry is mounted on the second card section; and
a mounting socket, mounted on an ONT circuit board, that receives at least a portion of the diplexer module, the mounting socket including a first chamber and a second chamber separated by a dividing wall to receive at least a portion of the circuit card,
wherein the circuit card defines a gap that substantially separates a portion of the first card section and a portion of the second card section, and wherein the gap is sized to permit insertion of the diplexer module into the mounting socket such that a portion of the first card section resides within the first chamber and a portion of the second card section resides within the second chamber.

39. The diplexer system of claim 38, wherein the dividing wall defines a slot oriented to interlock with the gap.

40. The diplexer system of claim 38, wherein the digital circuitry is configured to process digital data and digital voice information, and wherein the diplexer transmits a first optical signal carrying digital information in a first wavelength range, and receives a second optical signal carrying digital information in a second wavelength range.

41. The diplexer system of claim 38, wherein the diplexer and the digital circuitry are configured for use in an ONT of a passive optical network (PON).

42. A triplexer system for use in an optical network terminal (ONT) for use in an optical network, the triplexer system comprising:
an ONT circuit board including processing circuitry; and
a mounting socket, mounted on the ONT circuit board, the mounting socket comprising a dual pluggable module cage that receives at least a portion of a pluggable triplexer module that substantially conforms to a form factor of a dual pluggable module sized to fit within the mounting socket comprising the dual pluggable module cage,
wherein the mounting socket couples the pluggable triplexer module to the processing circuitry of the ONT circuit board.

43. The triplexer system of claim 42, wherein the dual pluggable module cage comprises a dual small form factor pluggable (SFP) module cage, and wherein the pluggable triplexer module substantially conforms to a form factor of a dual SFP module case sized to fit within the mounting socket comprising the dual SFP cage.

44. A triplexer system for use in an optical network terminal (ONT) for use in an optical network, the triplexer system comprising:
a mounting socket, mounted on an ONT circuit board, that receives at least a portion of a pluggable triplexer module, the mounting socket including a first chamber to receive at least a portion of digital circuitry of a triplexer module, and a second chamber to receive at least a portion of analog video circuitry of the triplexer module;
a first reciprocal connector that mates with a first connector of the triplexer module; and
a second reciprocal connector that mates with a second connector of the triplexer module,
wherein the first connector and the first reciprocal connector couple the digital circuitry to circuitry on the ONT circuit board, and
wherein the second connector and the second reciprocal connector couple the analog video circuitry to a source of power on the ONT circuit board.

45. The triplexer system of claim 44, further comprising a removable dividing wall within the mounting socket.

46. The triplexer system of claim 44, further comprising a slot defined by the second chamber, the slot permitting at least a portion of a radio frequency (RF) connector in the second card section of the triplexer module to protrude outward from the second chamber.

47. The triplexer system of claim 44, wherein at least one of the first and second chambers substantially conforms to a form factor of a small form factor pluggable (SFP) module standard.

48. The triplexer system of claim 44, wherein the optical network comprises a passive optical network (PON).

* * * * *

UNITED STATES PATENT AND TRADEMARK OFFICE
CERTIFICATE OF CORRECTION

PATENT NO. : 7,664,405 B2  
APPLICATION NO. : 11/122653  
DATED : February 16, 2010  
INVENTOR(S) : Mark T. Paulson Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1228 days.

Signed and Sealed this

Twenty-eighth Day of December, 2010

David J. Kappos  
*Director of the United States Patent and Trademark Office*